(12) United States Patent
Lewis et al.

(10) Patent No.: US 9,478,054 B1
(45) Date of Patent: Oct. 25, 2016

(54) IMAGE OVERLAY COMPOSITING

(71) Applicant: Google Inc., Mountain View, CA (US)

(72) Inventors: Justin Lewis, Marina del Rey, CA (US); Gavin James, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 14/076,199

(22) Filed: Nov. 9, 2013

(51) Int. Cl.
| | |
|---|---|
| G09G 5/00 | (2006.01) |
| H04N 5/265 | (2006.01) |
| G06T 11/60 | (2006.01) |
| G09G 5/377 | (2006.01) |
| G09G 5/02 | (2006.01) |
| G09G 5/30 | (2006.01) |
| G06T 5/50 | (2006.01) |
| G06T 3/40 | (2006.01) |
| G09G 5/14 | (2006.01) |
| G06T 5/00 | (2006.01) |

(52) U.S. Cl.
CPC ............ *G06T 11/60* (2013.01); *G06T 3/4038* (2013.01); *G06T 5/50* (2013.01); *G09G 5/026* (2013.01); *G09G 5/30* (2013.01); *G09G 5/377* (2013.01); *G06T 5/007* (2013.01); *G06T 2200/32* (2013.01); *G06T 2207/20172* (2013.01); *G06T 2207/20221* (2013.01); *G09G 5/14* (2013.01); *G09G 2340/10* (2013.01); *H04N 5/265* (2013.01)

(58) Field of Classification Search
CPC .......... G06T 2207/20221; G06T 5/50; G06T 3/4038; G06T 2200/32; G06T 2207/20208; G06T 5/007; G09G 5/377; G09G 2340/10; G09G 2340/12; G09G 5/026; G09G 5/30; G09G 2320/0271; H04N 5/265; H04N 7/181

USPC ........ 345/629, 605; 382/218, 274, 275, 284, 382/294; 348/218.1

See application file for complete search history.

(56) References Cited

U.S. PATENT DOCUMENTS

| | | | |
|---|---|---|---|
| 7,260,273 B2 * | 8/2007 | Sellers et al. ................. | 382/275 |
| 7,782,384 B2 | 8/2010 | Kelly | |
| 8,111,945 B2 | 2/2012 | Kehat et al. | |
| 8,160,392 B1 * | 4/2012 | Chien ........................... | 382/284 |
| 8,351,713 B2 | 1/2013 | Sun et al. | |
| 8,368,720 B2 * | 2/2013 | Peterson ....................... | 345/629 |
| 8,787,698 B2 * | 7/2014 | Winnemoeller et al. ..... | 382/284 |
| 8,866,841 B1 * | 10/2014 | Distler .......................... | 345/619 |
| 2005/0104900 A1 * | 5/2005 | Toyama et al. ............... | 345/629 |
| 2008/0025633 A1 * | 1/2008 | Szeliski ........................ | 382/274 |
| 2008/0117207 A1 * | 5/2008 | Yu et al. ....................... | 345/421 |
| 2010/0238164 A1 * | 9/2010 | Steedly et al. ................ | 345/419 |
| 2011/0007086 A1 * | 1/2011 | Kim et al. .................... | 345/581 |
| 2013/0034312 A1 | 2/2013 | Sudheendra et al. | |
| 2013/0051685 A1 * | 2/2013 | Shechtman et al. .......... | 382/218 |
| 2014/0002485 A1 * | 1/2014 | Summa et al. ............... | 345/629 |
| 2014/0035950 A1 * | 2/2014 | Jonsson ........................ | 345/629 |
| 2014/0232872 A1 * | 8/2014 | Kussel .......................... | 348/148 |
| 2014/0362173 A1 * | 12/2014 | Doepke et al. ................ | 348/36 |
| 2015/0093044 A1 * | 4/2015 | Feder et al. .................. | 382/284 |
| 2015/0281594 A1 * | 10/2015 | Sakaniwa et al. ..... | H04N 7/181 348/218.1 |

* cited by examiner

*Primary Examiner* — Jin-Cheng Wang

(57) ABSTRACT

Implementations generally relate to image overlay compositing. In some implementations, a method includes receiving a first image and a second image. The method further includes determining one or more attributes of each of the first image and the second image, where the one or more attributes includes one or more image types. The method further includes determining one or more compositing techniques combine the first image and the second image based on one or more of the attributes.

17 Claims, 3 Drawing Sheets

IMAGE OVERLAY COMPOSITING

BACKGROUND

Photos are essential to driving internet traffic for social networks and communication platforms. For social networks, photo's contribute in two significant ways. First, users become locked into the network as their photos are uploaded and compiled on it. Once on the network, it is frequently cumbersome for users to migrate their collection to other networks. Additionally posts with photos have much higher interaction rates than posts without photos.

The popularity and convenience of digital cameras as well as the widespread of use of Internet communications have caused user-produced images such as photographs to become ubiquitous. Image editing systems for various consumer electronic devices and personal computers enable a user to manipulate images. Such image editing systems typically require the user to understand complicated and difficult instructions to manipulate an image. This level of knowledge places advanced editing features out of the grasp of the average user.

SUMMARY

Implementations generally relate to image overlay compositing. In some implementations, a method includes receiving a first image and a second image. The method further includes determining one or more attributes of each of the first image and the second image, where the one or more attributes includes one or more image types. The method further includes determining one or more compositing techniques to combine the first image and the second image based on one or more of the attributes.

With further regard to the method, in some implementations, the determining of the one or more compositing techniques includes selecting among one or more of a gradient domain blending technique, an alpha blending technique, and a tone mapping technique. In some implementations, the determining of the one or more compositing techniques includes: matching the one or more attributes of at least one of the first image and the second image to one or more compositing techniques; and selecting the one or more compositing techniques based on the matching. In some implementations, determining of the one or more compositing techniques includes eliminating one or more compositing techniques. In some implementations, the method further includes enabling the user to drag the first image onto the second image to indicate that the first image is to be combined with the second image. In some implementations, the determining of the one or more compositing techniques is based on a voting scheme. In some implementations, the one or more determined compositing techniques are applied to video. In some implementations, the one or more determined compositing techniques are applied to animation.

In some implementations, a method includes receiving a first image and a second image. The method further includes determining one or more attributes of each of the first image and the second image, where the one or more attributes includes an image type. The method further includes determining one or more compositing techniques to combine the first image and the second image based on one or more of the attributes, where the determining of the one or more compositing techniques includes selecting among one or more of a gradient domain blending technique, an alpha blending technique, and a tone mapping technique.

With further regard to the method, in some implementations, the determining of the one or more compositing techniques includes: matching the one or more attributes of at least one of the first image and the second image to one or more compositing techniques; and selecting the compositing technique based on the matching. In some implementations, the determining of the one or more compositing techniques includes eliminating one or more compositing techniques. In some implementations, the method further includes enabling the user to drag the first image onto the second image to indicate that the first image is to be combined with the second image. In some implementations, the determining of the one or more compositing techniques is based on a voting scheme.

In some implementations, a system includes one or more processors, and logic encoded in one or more tangible media for execution by the one or more processors. When executed, the logic is operable to perform operations including: receiving a first image and a second image; determining one or more attributes of each of the first image and the second image, where the one or more attributes includes one or more image types; and determining one or more compositing techniques to combine the first image and the second image based on one or more of the attributes.

With further regard to the system, in some implementations, to determine the one or more compositing techniques, the logic when executed is further operable to perform operations including selecting among one or more of a gradient domain blending technique, an alpha blending technique, and a tone mapping technique. In some implementations, to determine the one or more compositing techniques, the logic when executed is further operable to perform operations including: matching the one or more attributes of at least one of the first image and the second image to one or more compositing techniques; and selecting the one or more compositing techniques based on the matching. In some implementations, to determine the one or more compositing techniques, the logic when executed is further operable to perform operations including eliminating one or more compositing techniques. In some implementations, the logic when executed is further operable to perform operations including enabling the user to drag the first image onto the second image to indicate that the first image is to be combined with the second image. In some implementations, the logic when executed is further operable to perform operations including determining the one or more compositing techniques based on a voting scheme. In some implementations, the one or more determined compositing techniques are applied to video.

DETAILED DESCRIPTION

Implementations described herein provide image overlay compositing. In various implementations, a system receives a first image and a second image, where the first image is to be combined with the second image. The system then determines one or more attributes of each of the first image and the second image, where the one or more attributes includes an image type. The system then determines a compositing technique to combine the first image and the second image based on one or more of the attributes. In various implementations, to determine the compositing technique to apply, the system selects among one or more of a gradient domain blending technique, an alpha blending technique, and a tone mapping technique.

In some implementations, to determine the compositing technique to apply, the system matches the one or more attributes of at least one of the first image and the second image to one or more compositing techniques, and then selects the compositing technique to apply based on the matching. In some implementations, to determine the compositing technique to apply, the system eliminates one or more compositing techniques to apply.

As described in more detail below, implementations provide users with a larger number of different compositing techniques for casual users to manipulate their photos. Implementations enable users to combine overlays of different compositing techniques to a given photo.

Figure 1:
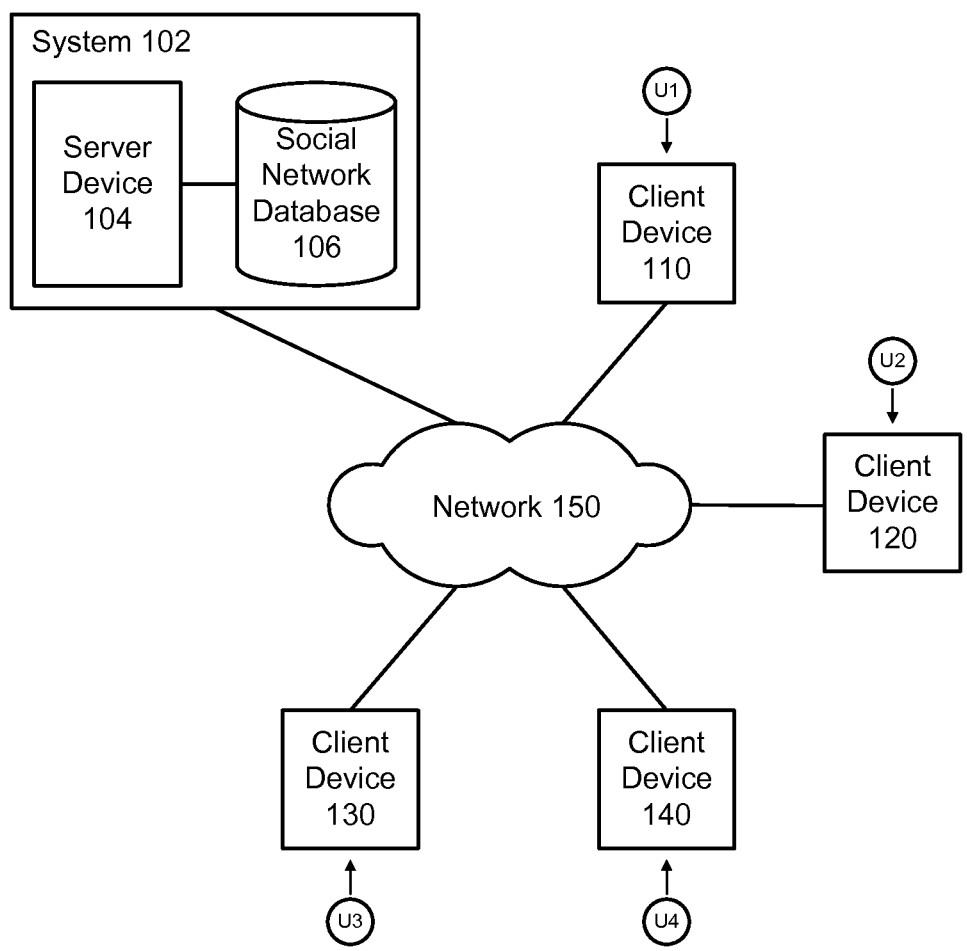
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other and with system 102 using respective client devices 110, 120, 130, and 140.

In the various implementations described herein, processor of system 102 causes the elements described herein (e.g., images associated with composites, etc.) to be displayed in a user interface on one or more display screens.

In various implementations, system 102 may utilize a recognition algorithm to determine if the content (e.g., a person) of a given image is of a particular image type. Example implementations of recognition algorithms are described in more detail below.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
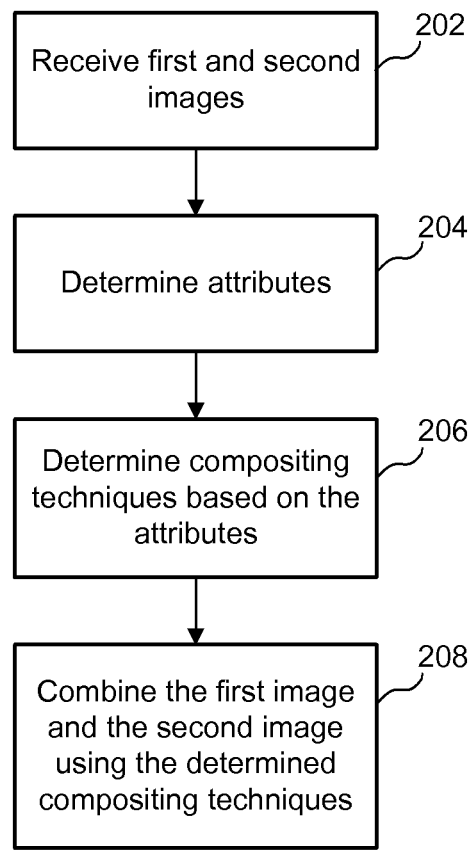
FIG. 2 illustrates an example simplified flow diagram for providing image overlay compositing, according to some implementations.

FIG. 2 illustrates an example simplified flow diagram for providing image overlay compositing, according to some implementations. As described in more detail below, system 102 determines the optimal image overlay compositing method for combining particular images into a single image. Such image overlay compositing methods may also be referred to as image overlay compositing techniques or mechanisms; overlay compositing methods, techniques, or mechanisms; compositing methods, techniques, or mechanisms; blending methods, techniques, or mechanisms.

Referring to both FIGS. 1 and 2, a method is initiated in block 202, where system 102 receives a first image and a second image, where the first image is to be combined with the second image. In various implementations, the first image, which is overlaid over the second image, may be referred to as a "sticker" or "overlay." The second image may be referred to as a "background," "underlay," or "target." Generally, when combining images, the combined images are foreground elements. In some scenarios, as in panoramas, the combined images may be background elements.

In various implementations, the first and second images may be received when the user uploads the images to system 102 or after the user combines the images with one or more photo albums. In some implementations, system 102 may enable a camera device (e.g., smart phone) of the user to automatically upload images to system 102 as the camera device captures photos. In various implementations, system 102 enables the user to indicate which image or images the user wants to combine with another image.

In some implementations, system 102 enables the user to drag and drop the first image onto the second image to indicate that the first image is to be combined with the second image. In some implementations, system 102 enables the user to drag and drop one or more portions of the first image onto the second image to indicate that those portions of the first image is to be combined with the second image. For example, system 102 may enable the user to select one or more elements or objects in the first image, and then drag and drop those elements onto the second image to indicate that the selected elements are to be combined with the second image.

In block 204, system 102 determines one or more attributes of each of the first image and the second image. In various implementations, one of the attributes may include the type of image. For example, a given image may be a natural image (e.g., a photo taken of a person). In another example, a given image may be cartoon. More examples of attributes are described in detail below.

In block 206, system 102 determines one or more compositing techniques to apply to combine the first image and the second image based on one or more of the attributes. In some implementations, to determine the one or more compositing techniques to apply, system 102 selects among one or more of a gradient domain blending technique, an alpha blending technique, and a tone mapping technique. Various implementations for determining techniques to apply when combining one or more images with one or more other images are described in more detail below.

In block 208, system 102 combines the first image and the second image using the one or more determined compositing techniques. For ease of illustration, some implementations are described herein in the context of a single image being combined with another image. These implementations and others also apply to multiple images being combined with another image. These implementations and others also apply to a single image being combined with multiple different images.

As indicated above, in various implementations, to determine the one or more compositing techniques to apply, system 102 determines a variety of attributes of the images to be composited. As described in more detail below, system 102 matches one or more attributes of the first image (overlay) and/or the second image (underlay) to one or more compositing techniques. System 102 then selects one or more compositing techniques to apply based on the matching.

In some implementations, the attributes used to select a compositing technique include image type. For example, an image type may be a natural image (e.g., a photo taken of a person). In another example, an image type may be a cartoon image.

System 102 may use any suitable algorithm to determine the image type for each of the images. For example, in various implementations, system 102 may determine if one of the images includes a face or part of a person. In various implementations, system 102 may utilize a recognition algorithm to determine if the content (e.g., a person) of a given image is of a particular image type. Example implementations of recognition algorithms are described in more detail below.

In some implementations, system 102 may determine the image type from metadata associated with each image. For example, metadata may indicate if the image is natural image, a cartoon image, a foreground element, a background element, etc.

In some implementations, the attributes used to select a compositing technique include texture. System 102 may use any suitable algorithm to determine the texture of each of the images.

In some implementations, the attributes used to select a compositing technique may include lighting characteristics. System 102 may use any suitable algorithm to determine the lighting characteristics of each of the images.

In some implementations, the attributes used to select a compositing technique may include border characteristics. System 102 may use any suitable algorithm to determine the border characteristics of each of the images.

The following description provides examples of how system 102 matches the determined attributes to one or more compositing techniques, and selects one or more compositing techniques based on the matching. As described in more detail below, each technique has strengths (advantages) and weaknesses.

In some implementations, if system 102 determines that either of the images (e.g., overlay or underlay) includes a face or body, system 102 may select gradient domain blending. For example, face swapping overlays and zombie bite marks are drastically improved by use of gradient domain blending or tone mapping.

In some implementations, if system 102 determines that the images (e.g., overlay or underlay) involves significantly different images and naturalistic lighting is desired, system 102 may select gradient domain blending. For example, the user may want to overlay flowers into another image, and may want to match the lighting.

In some implementations, if system 102 determines that either of the images (e.g., overlay or underlay) involves smooth border/boundary characteristics, system 102 may select gradient domain blending. Measuring the complexity of the boundary in terms of color shifts per linear unit strongly suggests which technique would yield immediately favorable results. In the case of a smooth boundary, either gradient domain blending and/or tone mapping results in a much more integrated look for the final overlay.

Generally, gradient domain blending allows finer control over the content of the overlay, because areas can be marked so that they do not change. In various implementations, gradient domain blending may involve the poisson equation and/or a multigrid solution.

In some implementations, if system 102 determines that the images (e.g., overlay or underlay) have similar color characteristics, system 102 may select gradient domain blending and a multigrid solution. A multigrid solution is fast and works well on images with similar colors.

In some implementations, if system 102 determines that resources are limited, system 102 might not select gradient domain blending and a multigrid solution, as it involves a complicated masking process and may be memory intensive. System 102 may instead select tone mapping, which is described in more detail below.

Tone mapping using convolution pyramids matches background color (including skin color) and lighting well. In some implementations, if system 102 determines that the naturalistic lighting of the images match and/or the images involve facial and/or body features, system 102 may select tone mapping.

In some implementations, if system 102 determines that either of the images (e.g., overlay or underlay) includes a face or body, system 102 may select tone mapping. For example, as indicated above, face swapping overlays and zombie bite marks are drastically improved by use of tone mapping (or by gradient domain blending).

In some implementations, if system 102 determines that either of the images (e.g., overlay or underlay) involves smooth border characteristics, system 102 may select tone mapping. As indicated above, in the case of a smooth boundary, tone mapping and/or gradient domain blending results in a much more integrated look for the final overlay.

In some implementations, if system 102 determines that one of the images is cartoony, system 102 may select alpha blending. If one of the images is cartoony, the user may be overlaying an item on a person (e.g., adding a Santa Claus hat, clown nose, or zombie scar, etc. to a person). Combining overlays in a photo is a popular feature among photo curation sites. In such scenarios, the user is probably not altering the face or body. In another example, the user may be overlaying a thought bubble or emotion icon, etc.

In some implementations, if system 102 determines that the overly boundary is excessively complex, system 102 may select alpha blending. Alpha blending generally looks better in situations where the overlay boundary is complex. This is because both gradient domain compositing and tone mapping spread the difference between the background and foreground at the border across the entire overlay to merge the images. This can result in strange color fluctuation and loss of overlay consistency with a very complex boundary.

In some implementations, to determine the one or more compositing techniques to apply, system 102 may eliminate one or more compositing techniques to apply. For example, alpha blending generally typically keeps most of the overlay intact, but does a poor job of matching background lighting and color offset. As such, if system 102 determines that the difference between the foreground and background significant, system 102 might select gradient domain blending or tone mapping. Gradient domain compositing is substantially more resource intensive in terms of computation time and memory requirements than tone mapping. As such, if an overlay is large, gradient domain compositing might be too expensive to use. System 102 may then select tone mapping. If an overlay is small, system 102 may select gradient domain blending. While tone mapping matches background color and lighting well, tone mapping does not allow finer control of areas in the overlay that should remain unchanged.

The particular technique that system 102 selects will depend on the particular implementation. In some implementations, system 102 may combine and/or modify blending techniques. In some instances, alpha blending and gradient blending blend the textures together. Tone mapping blends colors but not textures. As such, system 102 may use gradient blending, tone mapping, and alpha blending on different portions of a composite.

As indicated herein, tone mapping does not blend the texture particularly well. If the texture are different, system 102 might not select tone mapping and may instead select gradient domain blending, because gradient domain will smooth the textures together and provide the best look.

In some implementations, the attributes may include the purpose of the overlay. As such, system 102 may determine which compositing method to used based at least in part on the purpose of the overlay. For example, if the purpose of the overlay is for face stitching (e.g., copying a face from one image to another image), gradient domain compositing and tone mapping are substantially better than alpha blending because the lighting match is much better in the final result of gradient domain compositing and tone mapping. Accordingly, system 102 match overlays with the purpose of face stitching with gradient domain compositing and tone mapping.

In some implementations, if system 102 determines that a particular image will always use the same overlay mechanisms, system 102 use the same overlay technique whenever system 102 detects the same image. For example, if system 102 determines that a particular image is being treated as a tattoo, system 102 may apply tone mapping by default for that image.

In some implementations, system 102 may consider the complexity and time required to perform particular blending techniques. For example, gradient domain blending is complicated and is resource intensive. As such, system 102 might not select gradient domain blending for large images or may perform a scaled down version of the algorithm.

In some implementations, attributes may include user preferences for compositing methods. For example, in some implementations, system 102 may enables the user to select a preferred compositing method for a particular overlay. System 102 may then save the user preferences in a lookup table so that the next user who uses the overlay with have the method pre-selected.

In some implementations, system 102 may determine the one or more compositing techniques to apply based on a voting scheme. For example, system 102 may collect statistics on how people apply different blending techniques and select and/or make suggestions based on relative frequencies of previous user's choices (e.g., based a consensus).

In some implementations, system 102 may apply the one or more determined compositing techniques to video. In some implementations, system 102 may apply the one or more determined compositing techniques to animation. For example, overlays of photos or video (or both) may be animated. Overlaying an animated element on top of a photo will produce an animated photo (e.g., gif or webp). In various implementations, combined overlay elements may themselves be dynamic. For example, fireworks could be produced with particle effects.

In various implementations, the particular compositing methods described herein are interchangeable. Also, the user interface is interchangeable.

Implementations described herein provide various benefits. For example, implementations enabling fun and useful image editing functionality without the need for deep technical skill Implementations provide users with a larger number of different compositing techniques for casual users to manipulate their photos. Implementations enable users to combine overlays using different compositing techniques. Implementations described herein also increase overall engagement among users in a social networking environment.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

As indicated above, implementations enable a user, via system 102, to modify frames of different types of streams (e.g., video streams, audio streams, etc.) and streams being transmitted in different directions (e.g., outbound streams and/or inbound streams).

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Figure 3:
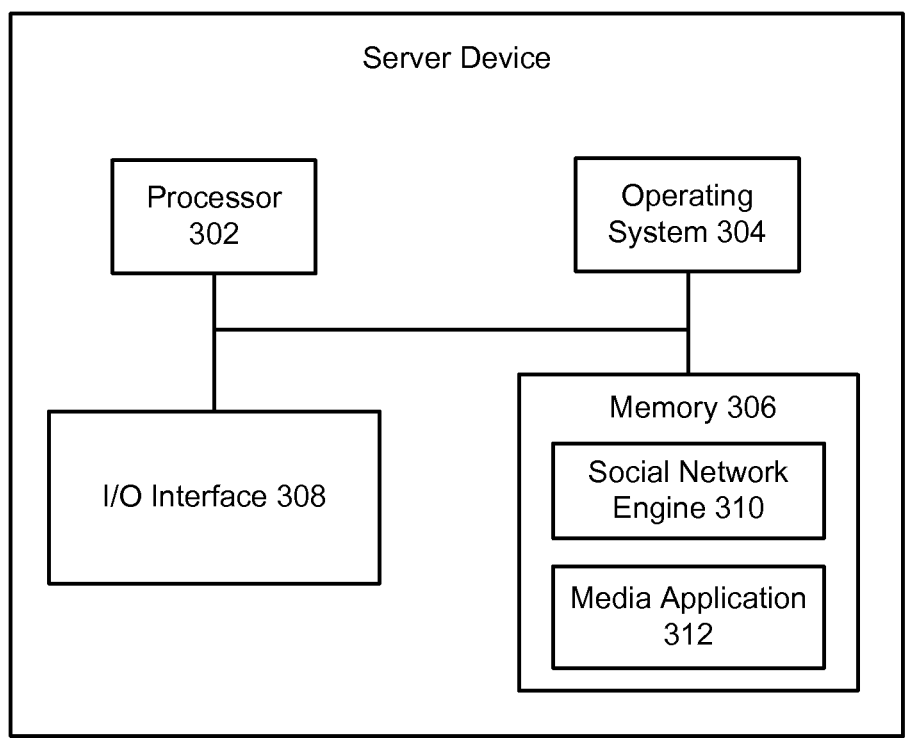
FIG. 3 illustrates a block diagram of an example server device, which may be used to implement the implementations described herein.

FIG. 3 illustrates a block diagram of an example server device 300, which may be used to implement the implementations described herein. For example, server device 300 may be used to implement server device 104 of FIG. 1, as well as to perform the method implementations described herein. In some implementations, server device 300 includes a processor 302, an operating system 304, a memory 306, and an input/output (I/O) interface 308. Server device 300 also includes a social network engine 310 and a media application 312, which may be stored in memory 306 or on any other suitable storage location or computer-readable medium. Media application 312 provides instructions that enable processor 302 to perform the functions described herein and other functions.

For ease of illustration, FIG. 3 shows one block for each of processor 302, operating system 304, memory 306, I/O interface 308, social network engine 310, and media application 312. These blocks 302, 304, 306, 308, 310, and 312 may represent multiple processors, operating systems, memories, I/O interfaces, social network engines, and media applications. In other implementations, server device 300 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
receiving a first image and a second image;
determining one or more attributes of the first image and the second image, wherein the one or more attributes include at least one of the following attributes: an image type, image size, a face content, a body content, a texture, a lighting characteristic, a color characteristic, and a border characteristic; and
selecting one or more of a gradient domain blending technique, an alpha blending technique, and a tone mapping technique to combine the first image and the second image based on the one or more attributes, wherein
selection of an alpha blending technique is based on at least one of the following first conditions: at least one of the first image and the second image includes a cartoon, a complex boundary of at least one of the first image and the second image, time available, and memory available, and
selection of at least one of a gradient domain blending technique and a tone mapping technique is based on at least one of the following second conditions: at least one of the first image and the second image includes a body or a face, the first image has color characteristics similar to color characteristics of the second image, the first image has lighting that is different than lighting of the second image, a smooth boundary of the first image and the second image, differences between a foreground and a background of the first image or the second image, a large size of at least one of the first image and the second image, and the first image has a texture that is different than a texture of the second image.

2. The method of claim 1, wherein selecting one or more of the gradient domain blending technique, the alpha blending technique, and the tone mapping technique comprises eliminating one or more compositing techniques.

3. The method of claim 1, wherein the method further comprises enabling a user to drag the first image onto the second image to indicate that the first image is to be combined with the second image.

4. The method of claim 1, wherein selecting one or more of the gradient domain blending technique, the alpha blending technique, and the tone mapping technique is based on a voting scheme.

5. The method of claim 1, wherein the method further comprises receiving a selection of one or more elements of the first image drug onto the second image, wherein the selected one or more elements are to be combined with the second image.

6. A non-transitory computer readable storage medium including instructions that, when executed by one or more processors, cause the one or more processors to perform a method comprising:
receiving a first image and a second image;
selecting at least one of an alpha blending technique, a gradient domain blending technique and a tone mapping technique to combine the first image and the second image, wherein
selection of an alpha blending technique is based on at least one of the following first conditions: at least one of the first image and the second image includes a cartoon, a complex boundary of at least one of the first image and the second image, time available, and memory available, and
selection of at least one of a gradient domain blending technique and a tone mapping technique is based on at least one of the following second conditions: at least one of the first image and the second image includes a body or a face, the first image has color characteristics similar to color characteristics of the second image, the first image has lighting that is different than lighting of the second image, a smooth boundary of the first image and the second image, differences between a foreground and a background of the first image or the second image, a large size of at least one of the first image and the second image, and the first image has a texture that is different than a texture of the second image.

7. The non-transitory computer readable storage medium of claim 6, wherein selecting at least one of the alpha blending technique, the gradient domain blending technique and the tone mapping technique comprises eliminating one or more compositing techniques.

8. The non-transitory computer readable storage medium of claim 6, further comprises enabling a user to drag the first image onto the second image to indicate that the first image is to be combined with the second image.

9. The non-transitory computer readable storage medium of claim 6, wherein selecting at least one of the alpha blending technique, the gradient domain blending technique and the tone mapping technique is based on a voting scheme.

10. The non-transitory computer readable storage medium of claim 6, wherein at least one of the first image and the second image is a video.

11. The non-transitory computer readable storage medium of claim 6, wherein at least one of the first image and the second image includes an animated element.

12. A system comprising:
one or more processors; and
logic encoded in one or more tangible media for execution by the one or more processors and when executed operable to perform operations comprising:
receiving a first image and a second image; and
determining one or more attributes of the first image and the second image, wherein the one or more attributes include at least one of the following attributes: image type, texture, lighting characteristics, and border characteristics; and
selecting at least one of an alpha blending technique, a gradient domain blending technique and a tone mapping technique to combine the first image and the second image based on one or more of the attributes, wherein
selection of an alpha blending technique is based on at least one of the following first conditions: at least one of the first image and the second image includes a cartoon, a complex boundary of at least one of the first image and the second image, time available, and memory available, and
selection of at least one of a gradient domain blending technique and a tone mapping technique is based on at least one of the following second conditions: at least one of the first image and the second image includes a body or a face, the first image has color characteristics similar to color characteristics of the second image, the first image has lighting that is different than lighting of the second image, a smooth boundary of the first image and the second image, differences between a foreground and a background of the first image or the second image, a large size of at least one of the first image and the second image, and the first image has a texture that is different than a texture of the second image; and
combining the first image and second image using the selected at least one of the alpha blending technique, the gradient domain blending technique and the tone mapping technique.

13. The system of claim 12, wherein, to select at least one of the alpha blending technique, the gradient domain blending technique and the tone mapping technique, the logic when executed is further operable to perform operations comprising eliminating one or more compositing techniques.

14. The system of claim 12, wherein the logic when executed is further operable to perform operations comprising enabling a user to drag the first image onto the second image to indicate that the first image is to be combined with the second image.

15. The system of claim 12, wherein selecting at least one of the alpha blending technique, the gradient domain blending technique and the tone mapping technique is based on a voting scheme.

16. The system of claim 12, at least one of the first image and the second image includes an animated element.

17. The system of claim 12, wherein the logic when executed is further operable to perform operations comprising receiving a selection of one or more elements of the first image drug onto the second image, wherein the selected one or more elements are to be combined with the second image.

\* \* \* \* \*